UNITED STATES PATENT OFFICE.

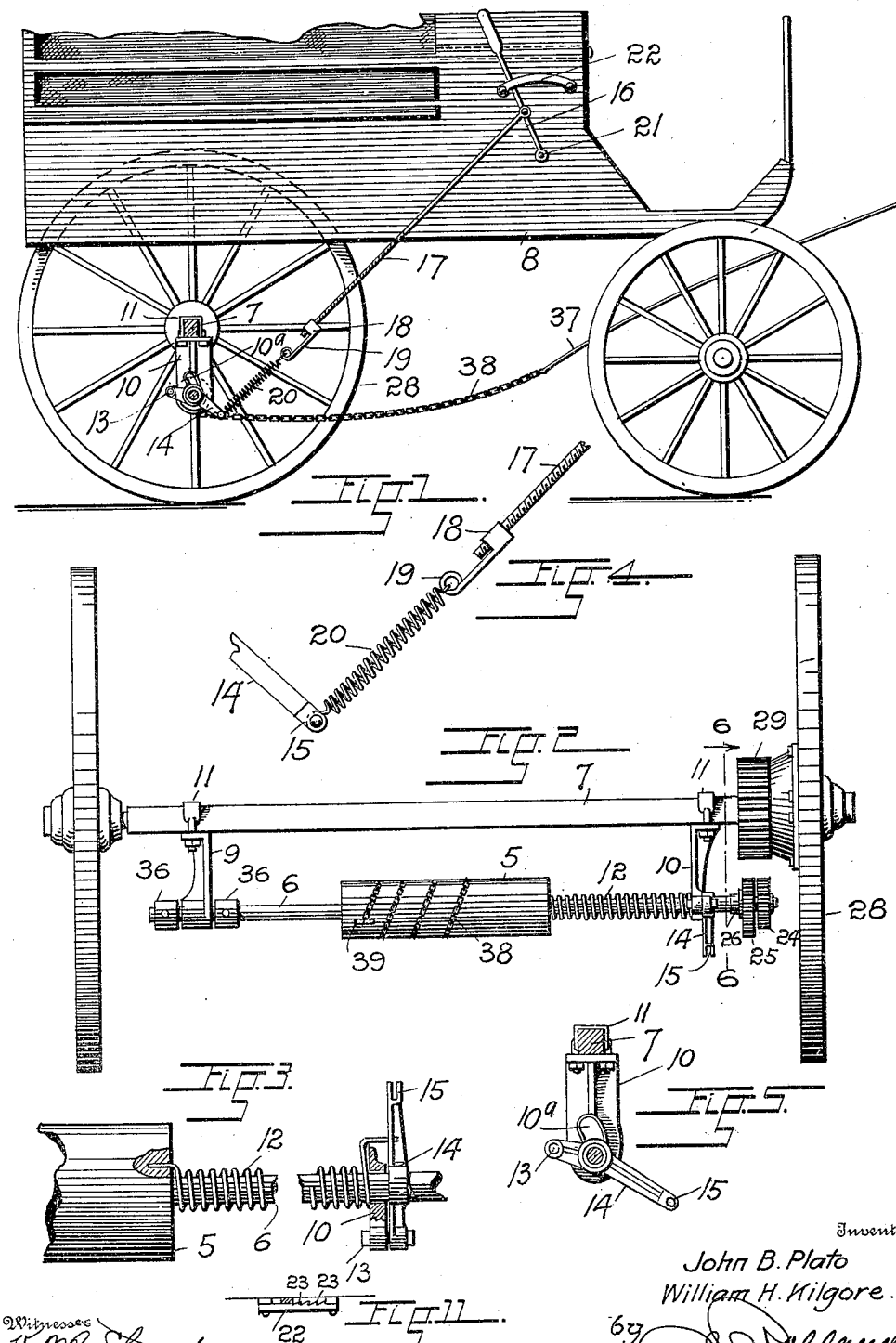

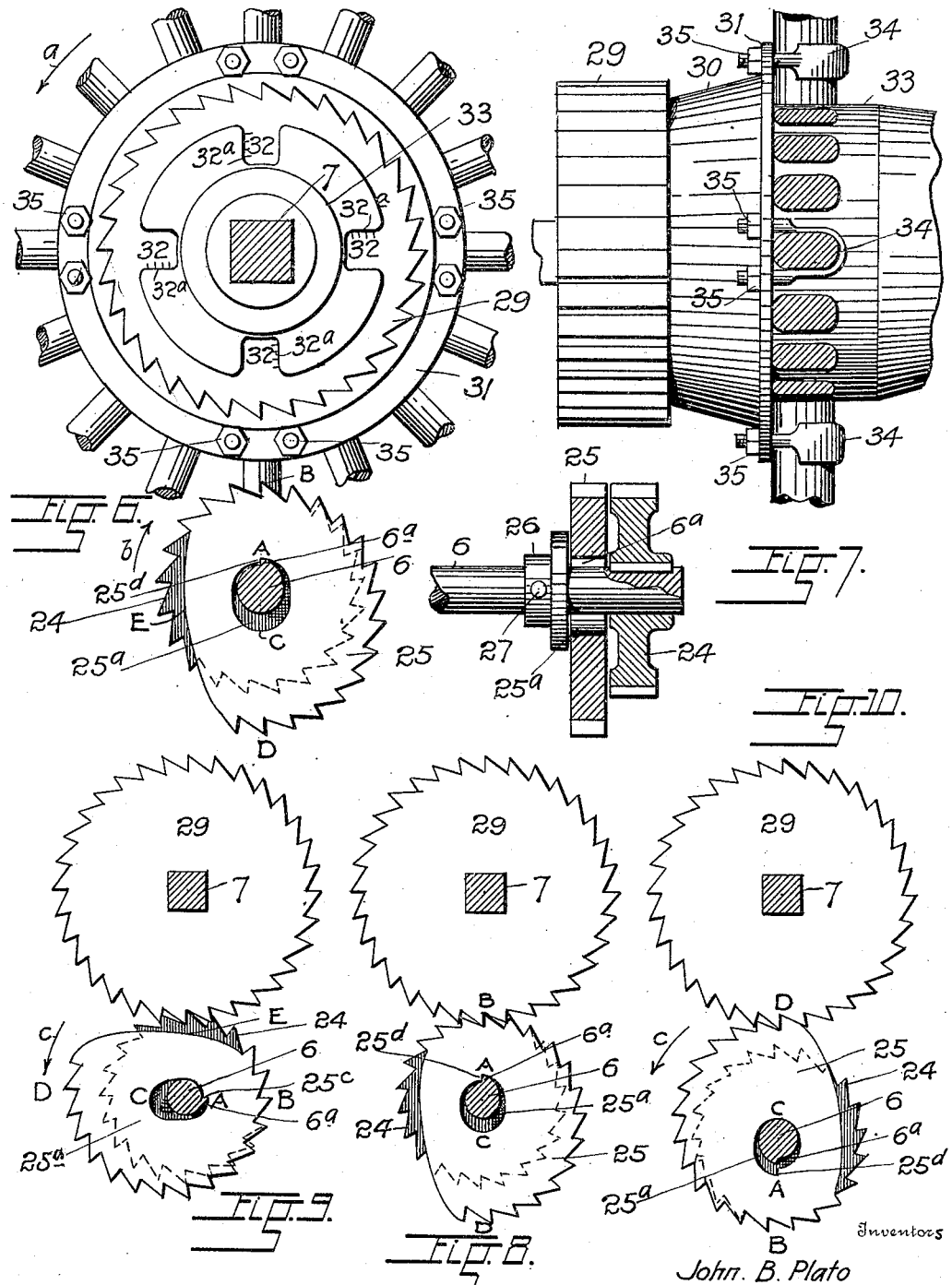

JOHN B. PLATO AND WILLIAM H. KILGORE, OF DENVER, COLORADO; SAID KILGORE ASSIGNOR TO SAID PLATO.

HITCHING ATTACHMENT FOR VEHICLES.

No. 807,047.      Specification of Letters Patent.      Patented Dec. 12, 1905.

Application filed April 29, 1905. Serial No. 258,028.

*To all whom it may concern:*

Be it known that we, JOHN B. PLATO and WILLIAM H. KILGORE, citizens of the United States of America, residing at Denver, in the county of Denver and State of Colorado, have invented certain new and useful Improvements in Hitching Attachments for Vehicles, of which the following is a specification.

Our invention relates to devices for preventing the running away of horses during the temporary absence of the driver, its object being to provide a simple attachment to vehicles which by a simple manipulation may be brought in operative connection with one of the wheels of the vehicle for the purpose of causing a strap attached to the bit or checkrein of the horse to be wound around a drum when the horse by going forward causes the wheel to revolve.

An additional but not less important object of our invention is to provide a device of the class described so constructed that when the horse after having gone forward backs as a natural result of the pull exerted on his head by the wound-up and tightened strap the aforementioned drum will automatically unwind the strap, thereby instantaneously releasing the horse's head while retaining the various parts of the device in proper connection to rewind the strap when the animal resumes its forward movement.

We attain our objects by the mechanism illustrated in the accompanying drawings, in the several figures of which like parts are similarly designated, and in which—

Figure 1 represents a side elevation of a vehicle, one of the hind wheels being removed to show our device as attached to the rear axle of the wagon; Fig. 2, an enlarged elevation showing the rear wheel and axle to which our improved attachment is applied; Fig. 3, a fragmentary plan view of one end of the winding-drum with shaft and adjacent supporting-bracket; Fig. 4, a fragmentary view of the rod and spring which connect the lever on our apparatus with the operating-lever; Fig. 5, a cross-section through the axle and drum-shaft, showing supporting-bracket and adjacent lever; Fig. 6, an enlarged section taken along the line 6 6, Fig. 2, looking in the direction of the arrow; Fig. 7, a side elevation of Fig. 6, the pinion and cam on the drum-shaft having been shown in section; Figs. 8, 9, and 10, diagrammatical views of the gear-wheels and cam in their relative positions during various steps in the operation of our device, and Fig. 11 a top view of the segmental guide shown in Fig. 1.

Our device consists of a winding-drum 5, rigidly secured to a shaft 6, which is held in its normal position parallel to and underneath the rear axle 7 of the vehicle 8 by means of two supporting hangers or brackets 9 and 10, secured to the axle near its opposite extremities by means of clips 11.

A spiral spring 12, the function of which will hereinafter be explained, is wound around shaft 6 in between bracket 10 and the adjacent end of drum 5, its opposite extremities being secured to a lever 14 and the drum, as shown in Fig. 3.

Fulcrumed to an extension of bracket 10 at 13 is a lever 14, adapted to support drum-shaft 6 and connected at its outer extremity 15 to the operating-lever 16 by means of a rod 17, one extremity of which is pivotally secured to lever 16, while its opposite extremity is threaded and provided with a turnbuckle 18, the outer extremity 19 of which is connected to the extremity 15 of lever 14 by a spiral spring 20. The resilient connection thus established besides affording compensation for varying distance between the spring-supported vehicle-box and the axles aids in holding the gears of our apparatus in mesh when shaft 6 is in its raised position, which, as will hereinafter be explained, is of great importance in the operation of our device.

The operating-lever 16, located near the seat within reach of the driver, is fulcrumed at 21 to the side of the wagon and held against lateral movement by a segmental guide 22. It may be held in any desired position in notches 23, as shown in Fig. 11.

We wish it understood that in place of lever 16 any other suitable means may be employed to operate the end of rod 17 and to hold it in any desired position.

The outer extremity of shaft 6 adjacent to bracket 10 is provided with a gear-wheel 24, adjacent to which is the elliptical mutilated cam-gear 25, the function and construction of which will hereinafter be explained, and which is held in position by a collar 26, secured to shaft 6 by a pin 27.

Rigidly secured to the hub of the adjacent wheel 28 of the vehicle is the large gear-wheel 29, the width of which should exceed the combined widths of gears 24 and 25 to permit said gears to simultaneously engage the teeth of the first-mentioned larger wheel 28. Although gear-wheel 29 may be secured to the wheel in any convenient manner, we preferably employ the method illustrated in Figs. 6 and 7. The gear-wheel, as shown, is provided with a hollow conically-shaped extension 30, having a flange 31. Projections 32 extend inwardly from the extension 30 and engaging the outer periphery of the hub 33 facilitate centering the gear on the wheel. Projections 32 may be provided with corresponding graduations $32^a$ to readily determine the amount of reduction needed in relation to the size of the hub to which gear 29 is to be fitted. The gear is held in place by means of a number of U-shaped clips 34 engaging a corresponding number of spokes on the wheel, their outer threaded extremities projecting through apertures in flange 31 and held by means of nuts 35.

Cam 25, which is free on the shaft, consists of an elliptical mutilated gear-wheel, having an elongated opening $25^a$, through which shaft 6 passes. The latter has been provided with a shoulder $6^a$, extending the full width of opening $25^a$, which has a correspondingly-shaped notch $25^c$. Opening $25^a$ is eccentrically located in the major axes of the elliptical wheel, the distance of its notched edge A to the extreme point B of the wheel, measured along said axes, being equal to the radius of the adjacent pinion 24 minus the radius of shaft 6, while the distance between the opposite point C of the slot to the point D of the wheel opposite to the point B should exceed the first-mentioned distance plus the depth of the teeth. One of the sides of cam-wheel 25 has been reduced at E, the distance from this point to the adjacent edge of slot $25^a$ being less than the above-described distance A to B. The periphery of cam-wheel 25, with the exception of its mutilated side, is provided with teeth corresponding in size and form to those of wheels 24 and 29. The teeth of wheels 24 and 29, as well as of cam-wheel 25, are, as shown in the drawings, of ratchet shape, this form of tooth being best suited to the purpose for which the wheels are intended. It should be understood, however, that wheels provided with differently-shaped teeth or even friction-wheels may be employed with satisfactory results.

To bring pinion 24 in mesh with the gear-wheel on the hub, the corresponding extremity of shaft 6 is raised through instrumentality of levers 14 and 16 and rod 17, hanger 10 to this end having been provided with a segmental slot $10^a$, through which shaft 6 travels, while the shaft-opening in bracket 9 has been made sufficiently large to permit the necessary movement of the opposite end of the shaft in slot $10^a$. Shaft 6 is held against longitudinal movement by collars 36, secured thereto at opposite sides of bracket 9.

37 is the hitching-strap by which the drum 5 may be connected to the bit, reins, or check-rein of the horse. A chain 38, secured to the drum at 39, may be substituted for the end of the strap adjacent to the drum to lessen the wear caused by constant winding and unwinding.

Having thus described the mechanical features of our invention, its operation is as follows: The different members of our device being assembled and attached to the vehicle as shown in the drawings, gear 24 is held out of engagement with the gear on wheel 28 by its own gravity, augmented by that of wheels 24 and 29 and lever 14. When arrived at his destination, the driver by pulling lever 16 forward causes the teeth of 24 to engage those of gear-wheel 29 and after having locked lever 16 in one of the notches 23 can safely leave the vehicle, being assured that the least forward movement of the horse will be checked by the tightening of strap 37, which being connected with the animal's head will exert a backward pull on same. The constant pull on its head will naturally cause the animal to reverse his movement and "back" against the vehicle, and unless his efforts are productive of the desired result—viz., the slackening of the hitching-strap by reversed rotation of the winding-drum—the animal is more than likely to persist in his rearward movement, which may cause considerable damage to the vehicle and objects against which it may impinge, as well as bodily injury to passers-by. It is for these reasons of great importance that means should be provided to automatically and instantaneously unwind the strap by reversing the movement of the drum the moment the vehicle moves rearwardly. This object we attain in our device by means of cam 25, which being mounted loosely on shaft 6 will normally be held in the position illustrated in Figs. 6 and 7 by the gravity of the part between C and D, which naturally exceeds that of the portion from A to B. The result is that when the teeth of wheel 24 engage those of gear 29 the teeth in the uppermost portion B of the cam-gear will simultaneously engage said teeth, as the distance from A to B equals the corresponding distance of gear 24. (See position in Fig. 8.) The forward movement of wheel 28 (in the direction of arrow $a$) will cause wheels 24 and 25 to move in the direction of arrow $b$, the former of which causes the winding of the hitching-strap, while the latter will be released from contact with the teeth of gear 29 and be brought to the position shown in Fig. 9, in which position it will remain during further forward movement of wheel 28. The moment the latter commences to turn in opposite direction the projection or shoulder $6^a$ on the shaft will engage notch $25^c$ in opening $25^a$, causing wheel 25 to rotate in opposite direction, (that of arrow $c$ in Figs. 9 and 10,) thus bringing the teeth of said wheel once more in mesh with those of gear 29. Further movement in the same direction will cause gear 29 to further rotate the cam, with the result that as the distance between the edges of the slot and the periphery of the wheel gradually increases shaft 6, which by action of spring 20 is being held in constant contact with the upper edge of slot 6ª, is forced downwardly, thereby drawing the teeth of gear 24 out of engagement with those of gear 29. Shoulder 6ª is at the same time being released from contact with notch 25ᶜ, (see Fig. 10,) with the result that the moment the release of the teeth of wheel 24 and of shoulder 6ª of shaft 6 has been accomplished drum 5 will be free to rotate in opposite direction and unwind the strap, being impelled by the action of spring 12, which, being secured to the drum and the arm of lever 14, was brought under tension during the forward movement of shaft 6.

It should be understood that although spring 12 greatly aids in unwinding the strap same may be dispensed with, for when the shaft is free to turn backwardly the natural tendency of the animal to move its head forward will cause the strap to unwind.

Having thus described our invention, what we claim is—

1. A device of the class described comprising in combination with a vehicle, a gear-wheel rigidly secured to one of its wheels, a vertically-movable shaft revolubly mounted on said vehicle, a drum on said shaft, a gear-wheel mounted on said shaft and adapted to engage the first-mentioned gear when the shaft is raised, means adapted to raise said shaft, means adapted to resiliently retain the shaft in its raised position, means to disengage the gears through action of the rearward movement of the vehicle and means to simultaneously cause reverse rotation of the shaft.

2. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, means adapted to raise said shaft, means to disengage the gears through action of the rearward movement of the vehicle and means to simultaneously cause reverse rotation of the shaft.

3. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, means adapted to raise said shaft, and a cam loosely mounted on said shaft and adapted to disengage said gears during rearward movement of the vehicle.

4. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, means adapted to raise said shaft, and a cam on said shaft adapted to force said shaft downwardly during the rearward movement of the vehicle.

5. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, means adapted to raise said shaft, a cam loosely mounted on said shaft and adapted to disengage said gears during rearward movement of the vehicle, and means adapted to rotate said shaft in reverse direction when said gears are disengaged.

6. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, means adapted to raise said shaft, a spring adapted to be brought under tension by the rotation of the shaft during the forward movement of the vehicle, and means to cause the disengagement of said wheels by action of the rearward movement of the vehicle.

7. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, a lever, fulcrumed to a suitable stationary part of the attachment, supporting the shaft, a rod, one extremity of which extends from a suitable part of the vehicle and a spring connecting its opposite extremity with said lever.

8. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, a lever, fulcrumed to a suitable stationary part of the attachment, supporting the shaft, a rod, one extremity of which extends from a suitable part of the vehicle, its opposite end being threaded, a turnbuckle on said threaded extremity, and a spring connecting said turnbuckle and said lever.

9. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, a lever, fulcrumed to a suitable stationary part of the attachment, supporting the shaft, a flexible, adjustable, connection leading from said lever to a point in convenient proximity to the occupant of the vehicle, and a spring wound round said shaft, one of its extremities being secured thereto while its opposite extremity is connected with said lever.

10. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, a lever, fulcrumed to a suitable stationary part of the attachment, supporting the shaft, a flexible, adjustable, connection leading from said lever to a point in convenient proximity to the occpant of the vehicle, a spring wound around said shaft, one of its extremities being secured thereto while its opposite extremity is connected with said lever, and a cam on said shaft adapted to engage the gear-wheel on the vehicle and to separate said gear-wheel and the gear on the shaft during rearward movement of the vehicle.

11. A device of the class described comprising in combination with a vehicle, a gear-wheel rigidly secured to one of its wheels, a vertically-movable shaft revolubly mounted on said vehicle, a gear-wheel mounted on said shaft and adapted to engage the first-mentioned gear when the shaft is raised, means for raising said shaft, and a spring wound round said shaft, one of its extremities being secured thereto while its opposite extremity is connected with said lever.

In testimony whereof we have affixed our signatures in presence of two witnesses.

JOHN B. PLATO.
WILLIAM H. KILGORE.

Witnesses:
G. J. ROLLANDET,
K. M. STUMP.